US008383722B2

(12) United States Patent
Takamura et al.

(10) Patent No.: US 8,383,722 B2
(45) Date of Patent: Feb. 26, 2013

(54) ELECTRICALLY NEUTRAL DISPERSIONS AND METHOD OF PREPARING SAME

(75) Inventors: Koichi Takamura, Penn Valley, CA (US); Armin Burghart, Charlotte, NC (US)

(73) Assignee: BASF SE (DE)

( * ) Notice: Subject to any disclaimer, the term of this patent is extended or adjusted under 35 U.S.C. 154(b) by 0 days.

(21) Appl. No.: 13/545,677

(22) Filed: Jul. 10, 2012

(65) Prior Publication Data
US 2012/0277374 A1 Nov. 1, 2012

Related U.S. Application Data

(60) Division of application No. 12/296,421, filed as application No. PCT/US2007/065934 on Apr. 4, 2007, now Pat. No. 8,217,111, which is a continuation of application No. 11/400,623, filed on Apr. 7, 2006, now abandoned, and a continuation of application No. 11/399,816, filed on Apr. 7, 2006, now abandoned.

(51) Int. Cl.
*C08F 2/04* (2006.01)
*C08L 33/08* (2006.01)
*C08L 9/00* (2006.01)
*C08K 5/13* (2006.01)
*C08K 5/05* (2006.01)
*C10L 1/16* (2006.01)

(52) U.S. Cl. ........ 524/556; 524/571; 524/577; 524/736; 524/765; 524/766; 524/850; 524/853; 524/856

(58) Field of Classification Search .................. 524/556, 524/571, 577, 736, 765, 766, 850, 853, 855, 524/856
See application file for complete search history.

(56) References Cited

U.S. PATENT DOCUMENTS

| RE24,906 | E | 12/1960 | Ulrich |
|---|---|---|---|
| 3,410,711 | A | 11/1968 | Hoge |
| 3,622,531 | A | 11/1971 | Buselli et al. |
| 3,736,285 | A | 5/1973 | Miller |
| 4,337,185 | A | 6/1982 | Wessling et al. |
| 4,590,238 | A | 5/1986 | Furomoto et al. |
| 4,596,834 | A | 6/1986 | Widener et al. |
| 4,632,960 | A | 12/1986 | Sato et al. |
| 5,202,375 | A | 4/1993 | Biale |
| 5,424,122 | A | 6/1995 | Crandall et al. |
| 5,874,498 | A * | 2/1999 | Daniels et al. ................ 524/563 |
| 6,083,494 | A | 7/2000 | Samain et al. |
| 6,258,890 | B1 | 7/2001 | Schmidt-Thuemmes et al. |
| 6,444,748 | B1 | 9/2002 | Angel et al. |
| 6,540,822 | B2 | 4/2003 | Wates et al. |
| 6,710,122 | B2 | 3/2004 | Angel et al. |
| 6,762,269 | B1 | 7/2004 | Maxim, Jr. et al. |
| 6,818,685 | B1 | 11/2004 | Chapman |
| 2002/0082319 | A1 | 6/2002 | Zhao et al. |
| 2003/0139522 | A1 | 7/2003 | Koppers et al. |
| 2003/0215286 | A1 | 11/2003 | Takamura |
| 2004/0106725 | A1 | 6/2004 | Antonucci et al. |

FOREIGN PATENT DOCUMENTS

| DE | 19503099 A1 | 8/1995 |
|---|---|---|
| EP | 0156971 B1 | 11/1988 |
| EP | 795591 A2 * | 9/1997 |
| EP | 0795591 B1 | 9/1997 |

OTHER PUBLICATIONS

George Odian, Principles of Polymerization 365 (4th ed., J. Wiley & Sons 2004).
Martin J. Schick, Nonionic Surfactants: Phys. Chem. 450, vol. 23 (1987).
Koichi Takamura, Polymer Colloids, Kirk-Othmer Encyclopedia of Chem. Tech. (J. Wiley & Sons 2001).
Capek, Ignác, "Sterically and Electrosterically Stabilized Emulsion Polymerization Kinetics and Preparation, Advances in Colloid and Interface Science," Elsevier Science B.V., 2002, vol. 99, pp. 77-162.
International Search Report, mailed Jul. 24, 2007, in International Application No. PCT/US2007/065935.
International Search Report, mailed Aug. 27, 2007, in International Application No. PCT/US2007/065934.
Material Safety Data Sheet for IGEPAL CA-630, Rhodia, Inc., Apr. 18, 2001, 1 page.

* cited by examiner

*Primary Examiner* — Michael M Bernshteyn
(74) *Attorney, Agent, or Firm* — Meunier Carlin & Curfman, LLC

(57) ABSTRACT

The invention is a method of producing an essentially electrically neutral polymer dispersion, comprising a polymerizing one or more monomers in the presence of a nonionic surfactant, wherein the polymerization preferably occurs in the absence of ionic surfactants. The invention also includes methods of producing positively or negatively charged polymer dispersions comprising producing the essentially non-ionic polymer dispersion and further adding a cationically-charged or anionically-charged surfactant or electrolyte. The invention further includes dispersions produced by the methods of the invention and polymer films and powders produced from these dispersions.

18 Claims, No Drawings

ELECTRICALLY NEUTRAL DISPERSIONS AND METHOD OF PREPARING SAME

CROSS-REFERENCE TO RELATED APPLICATIONS

This application is a division of U.S. patent application Ser. No. 12/296,421, filed Mar. 4, 2009, which claims priority to PCT/US07/65934, filed Apr. 4, 2007, which claims priority to U.S. patent application Ser. No. 11/399,816, filed Apr. 7, 2006 and U.S. patent application Ser. No. 11/400,623, filed Apr. 7, 2006.

BACKGROUND OF THE INVENTION

The invention relates to polymer dispersions, also known as latices, particularly polymer dispersions which are electrically neutral or mildly anionic that can be used, e.g., to produce anionic or cationic polymer dispersions.

Polymer dispersions or latices consist of small particles of polymers, typically ranging in size from 60 nm to 250 nm, dispersed in water. They are typically produced using emulsion polymerization, and can be used in a wide range of industrial applications, including paints, paper coatings, seal coatings, waterproofing membranes, adhesives, carpet backing, printing inks, non-woven fabric, leather finishing, dipping goods, asphalt and concrete modifications, medical applications, and the modification of plastic materials. Styrene-butadiene copolymers, polyacrylates, and vinyl-acetate polymers account for 95% of the total production of polymer dispersions worldwide. When dried at temperatures above the polymer dispersion's minimum film-forming temperature, polymer dispersions form a polymer film that can be clear or opaque, hard or tacky, and plastic or elastic, depending on the particular properties of the polymer dispersion. Though a polymer film may not be visible after drying, it often provides critical properties to the end product.

Most commercial polymer dispersions are negatively charged due to the presence of anionic surfactants and copolymerizable vinyl acids added to the recipe during emulsion polymerization. This process of producing anionically charged polymer dispersions is often referred to as carboxylation. Carboxylation is extensively used to produce anionically-charged polymer dispersions used in wide range of applications, including paper coating, paint, carpet backing, and adhesives.

In some specific applications, such as paper making, paper sizing and emulsion-based asphalt paving, cationically-charged, rather than anionically-charged, polymer dispersions are desired. One known method of producing cationically-charged polymer dispersions uses a cationic surfactant, a cationic polyelectrolyte, and a small amount of monomers with cationic functional groups which can be co-polymerized together with other major monomers, such as styrene, diene and acrylate derivatives, to produce the polymer dispersion. However, production facilities using this method of producing cationic polymers must be isolated from production facilities that produce anionic polymer dispersions, because cross-contamination of the two differently charged polymer dispersions can cause immediate coagulum formation.

Another method of producing cationically-charged polymer dispersions is transforming a negatively-charged polymer dispersion to a cationically-charged one by adding a cationic surfactant. This process, often referred to as "flipping," has been exercised commercially for at least 30 years with anionic polystyrene butadiene rubber (SBR) latex. This flipping process is limited to a very narrow range of polymer dispersions and is difficult to exercise with most carboxylated polymer dispersions. U.S. Pat. No. 5,045,576 assigned to Dow Chemical describes a method of flipping a carboxylated poly(styrene-butadiene) latex to produce a cationic polymer dispersion that can be used in asphalt applications. In the flipping process described in U.S. Pat. No. 5,045,576, a large amount of a nonionic emulsifier with a high molecular weight of polyethylene oxide $((EO)_m$ where m>20) is added to the polymer dispersion prior to addition of the cationic emulsifier. The pH of the dispersion is then reduced by adding an aqueous inorganic acid solution.

One disadvantage of the polymer dispersions produced via the described flipping process is that a polymer film prepared from the polymer dispersion is highly sensitive to water, resulting in a low wet tensile strength with a high degree of water adsorption. Another disadvantage of polymer dispersions produced with the described flipping process is that, in asphalt applications, the presence of the surfactants reduces asphalt adhesion to aggregate. This reduction of adhesion causes premature stripping of the asphalt from the aggregate surface by traffic during the lifetime of the pavement.

Another method of producing polymer dispersions, particularly poly(ethylene-vinyl acetate) or polychloroprene dispersions, comprises polymerizing the monomers in the presence of water-soluble, high molecular weight, nonionic polymers. These nonionic polymer molecules adsorb on the surface of polymer particles during the emulsion polymerization process, and act as a protective colloid to maintain the dispersion's stability. However, a disadvantage to using these types of protective colloids is that a polymer film prepared from a polymer dispersion that includes these protective colloids is sensitive to water and displays a high degree of water absorption and a low wet tensile strength. Thus, polymer dispersions produced using these protective colloids suffer from the same problems as polymer dispersions produced using the flipping process. A polychloroprene dispersion produced using these protective colloids (Neoprene from DuPont Elastomers) has been used for various applications since the 1950's.

Polymer dispersions stabilized with a protective colloid by the process described above can be combined with a cationic surfactant to produce a cationic emulsion. However, a disadvantage to producing cationic emulsions in this manner is that only limited types of cationic surfactants can be used to produce the polymer dispersions. Furthermore, the resulting emulsion can actually be too stable, and the excess stability can hinder the ability of the polymer dispersion to cure for certain applications, such as rapid-setting asphalt emulsions.

Because of above discussed limitations in the methods of producing cationic polymer dispersions, it would be desirable to produce a cationic polymer dispersion wherein the resulting dried polymer film is highly water resistant; absorbs very little water, and maintains a high wet tensile strength. It is also desired that these polymer dispersions can be used over a wide range of pH's from acidic to alkaline conditions. Furthermore, it would be desirable to produce a polymer dispersion that can maintain its colloidal stability in the presence of various types of cationic surfactants and cationic polyelectrolytes, such as those typically used for paper making, paper sizing and road paving applications. It would also be desirable to be able to use existing production facilities for anionic polymer dispersions to produce polymer dispersions that can be rendered into cationic polymer dispersions having the desired properties described herein.

BRIEF SUMMARY OF THE INVENTION

The present invention overcomes the problems of the prior art by providing a method of producing an essentially electrically neutral polymer dispersion comprising polymerizing one or more nonionic monomers at a polymerization temperature in the presence of at least one nonionic surfactant. Preferably, the polymerizing step occurs in the absence of ionic (i.e. anionic or cationic) surfactants and preferably in the absence of ionic monomers. In one preferred embodiment, the at least one nonionic surfactant includes a nonionic surfactant comprising an alkylene oxide adduct of an alkyl alcohol, alkylbenzene alcohol or dialkylbenzene alcohol, wherein the number of alkylene oxide groups is less than or equal to 14. More preferably, the at least one nonionic surfactant includes a nonionic surfactant comprising an ethylene oxide $(EO)_m$ and/or propylene oxide $(PO)_n$ adduct of an alkyl alcohol, alkylbenzene alcohol or dialkylbenzene alcohol, wherein $(m+n) \leq 14$. In another preferred embodiment, the cloud point temperature of the nonionic surfactant is less than the polymerization temperature used in the polymerizing step. By using the nonionic surfactant of the invention, a colloidally-stable polymer dispersion can be produced, e.g., by emulsion polymerization.

It was surprising and unexpected that using a nonionic surfactant, particularly an alkylene oxide adduct of an alkyl alcohol, alkylbenzene alcohol or dialkylbenzene alcohol wherein the number of alkylene oxide groups is less than or equal to 14, and more particularly a nonionic surfactant comprising an ethylene oxide $(EO)_m$ and/or propylene oxide $(PO)_n$ adduct with $(m+n) \leq 14$ of an alkyl alcohol, alkylbenzene alcohol, or dialkylbenzene alcohol, while eliminating the anionic surfactant conventionally used in emulsion polymerization would not cause instability of the polymer dispersion during the emulsion polymerization process, particularly when the polymerization reaction is performed above the cloud point of the nonionic surfactant.

The nonionic surfactant used according to the invention preferably comprises an ethylene oxide $(EO)_m$ and/or propylene oxide $(PO)_n$ adduct of an alkyl alcohol, alkylbenzene alcohol, or dialkylbenzene alcohol wherein $(m+n) \leq 14$, more preferably with $(m+n) \leq 12$, most preferably with $(m+n) \leq 10$ (e.g. $6 \leq (m+n) \leq 10$). At least one amphoteric surfactant can also be used in the polymerization step. The monomers used to produce the polymer according to the invention can preferably include styrene, at least one monomer selected from the group consisting of (meth)acrylate monomers, and preferably (meth)acrylamide or derivatives thereof. Alternatively, the monomers can preferably include styrene and butadiene, optionally at least one monomer selected from the group consisting of (meth)acrylate monomers, and preferably (meth)acrylamide or derivatives thereof. The dispersing medium in the polymerizing step preferably includes water, thus producing an aqueous polymer dispersion. Furthermore, an emulsion polymerization process is preferably used to produce the polymer dispersion of the invention and a seed latex such as a polystyrene-based seed latex is preferably used in the emulsion polymerization process.

The essentially electrically neutral polymer dispersion produced according to the invention can also be used to produce both anionic and cationic polymer dispersions. Therefore, both anionic and cationic polymer dispersions can be produced using most of the same conventional emulsion polymerization equipment at the same production facility without causing coagulation and other problems associated with cross-contamination.

In particular, the invention includes a method of producing a cationically charged polymer dispersion, comprising the steps of producing the essentially electrically neutral polymer dispersion by polymerizing one or more monomers at a polymerization temperature in the presence of a nonionic surfactant comprising an ethylene oxide $(EO)_m$ and/or propylene oxide $(PO)_n$ adduct of an alkyl alcohol, alkylbenzene alcohol or dialkylbenzene alcohol wherein $(m+n) \leq 14$, wherein the polymerization occurs in the absence of anionic surfactants, and adding one or more of a cationic emulsifier and a cationic electrolyte to the dispersion to produce the cationically charged polymer dispersion. Furthermore, the invention also includes a method of producing an anionically charged polymer dispersion, comprising the steps of producing the essentially electrically neutral polymer as described, wherein the polymerization occurs in the absence of anionic surfactants, and adding one or more of an anionic emulsifier and an anionic electrolyte to the dispersion to produce the anionically charged polymer dispersion.

The present invention also includes a polymer dispersion produced by the methods described above. Furthermore, the invention includes a method of producing a polymer film comprising producing an essentially electrically neutral, cationic or anionic polymer dispersion by the processes described above and evaporating the dispersing medium in the polymer dispersion.

These and other features and advantages of the present invention will become more readily apparent to those skilled in the art upon consideration of the following detailed description, which describes both the preferred and alternative embodiments of the present invention.

DETAILED DESCRIPTION OF THE INVENTION

The present invention will now be described more fully hereinafter wherein some, but not all embodiments, of the invention are described. Indeed, the invention can be embodied in many different forms and should not be construed as limited to the embodiments set forth herein; rather, these embodiments are provided so that this disclosure will satisfy applicable legal requirements. Many modifications and other embodiments of the inventions set forth herein will come to mind to one skilled in the art to which these inventions pertain having the benefit of the teachings presented in the foregoing descriptions. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation. The term "comprising" and variations thereof as used herein is used synonymously with the term "including" and variations thereof and are open, non-limiting terms.

The essentially electrically neutral polymer dispersion according to the invention can be prepared using a dispersion, mini-emulsion, or emulsion polymerization process, and preferably an emulsion polymerization process is used. The emulsion polymerization process can be continuous, batch, or semi-batch according to the invention and is preferably a semi-batch process. The process according to the invention can use a single reactor or a series of reactors as would be readily understood by those skilled in the art. For example, a review of heterophase polymerization techniques is provided in M. Antonelli and K. Tauer, Macromol. Chem. Phys. 2003, vol. 204, p 207-219.

The polymer dispersion of the invention is preferably prepared by first charging a reactor with a seed latex, water, and optionally the at least one nonionic surfactant and/or at least one of the monomers and/or portions thereof. The seed latex helps initiate polymerization and helps produce a polymer having a consistent particle size. Any seed latex appropriate for the specific monomer reaction can be used and preferably a polystyrene seed is used. The initial charge typically also includes a chelating or complexing agent such as ethylenediamine tetraacetic acid (EDTA). Other compounds such as buffers can be added to the reactor to provide the desired pH for the emulsion polymerization reaction. For example, bases or basic salts such as KOH or tetrasodium pyrophosphate can be used to increase the pH whereas acids or acidic salts can be used to decrease the pH. The initial charge can then be heated to a temperature at or near the reaction temperature, for example, to between 50° C. and 100° C. Preferably, the initial charge is heated to a temperature between 70° C. and 95° C.

After the initial charge, the monomers that are to be used in the polymerization can be continuously fed to the reactor in one or more monomer feed streams. The monomers can be supplied as a pre-emulsion in an aqueous medium, particularly if acrylate monomers are used in the polymerization. Typically, an initiator feed stream is also continuously added to the reactor at the time the monomer feed stream is added although it may also be desirable to include at least a portion of the initiator solution to the reactor prior to adding a monomer pre-emulsion if one is used in the process. The monomer and initiator feed streams are typically continuously added to the reactor over a predetermined period of time (e.g. 1.5-5 hours) to cause polymerization of the monomers and to thereby produce the polymer dispersion. The nonionic surfactant according to the invention and any other surfactants are also typically added at this time as part of either the monomer stream or the initiator feed stream although they can be provided in a separate feed stream. Furthermore, one or more buffers can be included in either the monomer or initiator feed streams or provided in a separate feed stream to modify or maintain the pH of the reactor.

As mentioned above, the monomer feed stream can include one or more monomers. The monomers can be fed in one or more feed streams with each stream including one or more of the monomers being used in the polymerization process. For example, styrene and butadiene are typically provided in separate monomer feed streams and can also be added as a pre-emulsion when used in accordance with the invention. It can also be advantageous to delay the feed of certain monomers to provide certain polymer properties or to provide a layered structure (e.g. a core/shell structure). In accordance with the invention, one monomer can be provided in the polymerization process to produce a homopolymer although typically two or more monomers are copolymerized to produce a copolymer.

The monomers for use in the invention are preferably nonionic monomers. Exemplary nonionic monomers include styrene, C1-C8 alkyl and C2-C8 hydroxyalkyl esters of acrylic and methacrylic acid (e.g. ethyl acrylate, ethyl methacrylate, methyl methacrylate, 2-ethylhexyl acrylate, butyl acrylate, butyl methacrylate, hydroxypropyl acrylate, hydroxypropyl methacrylate, dimethylhydroxypropyl(meth)acrylate, 2-hydroxyethyl acrylate, hydroxyethyl methacrylate, and 2-hydroxybutyl methacrylate), 2-acetoacetoxyethyl methacrylate (AAEM), 1,4-butanediyl diacrylate, acrylamide, methacrylamide, N-methylacrylamide, N,N-dimethylacrylamide, N,N-diethylacrylamide, N-isopropylacrylamide, N-t-butylacrylamide, N-methylolacrylamide, N-vinylformamide, N-vinylmethylacetamide, vinyl esters (e.g. vinyl acetate, vinyl propionate, vinyl butyrate, and vinyl caprolate), divinylbenzene, vinyltriethoxysilane, t-butylstyrene, isopropylstyrene, p-chlorostyrene, acrylonitrile, methacrylonitrile, C4-C8 dienes (e.g. butadiene), isoprene, vinyl chloride, vinylidene chloride, and the like, and mixtures thereof. The monomers used according to the invention may include cross-linking monomers, such as butanediene, 1,4-butanediyl diacrylate, and divinylbenzene.

The monomers for use in the invention can also include a small amount (0.5% by weight or less, based on the total monomer weight) of one or more ionic monomers. Exemplary monomers include carboxylic acid monomers (e.g. itaconic acid, fumaric acid, and (meth)acrylic acid).

In one preferred embodiment of the invention, the monomers include styrene and at least one monomer selected from the group consisting of (meth)acrylate monomers, to produce a styrene-acrylic latex. More preferably, the meth(acrylate) monomers according to the invention include one or more monomers selected from the group consisting of 2-ethylhexylacrylate, n-butylacrylate, and methyl methacrylate. The monomers also preferably include acrylamide, methacrylamide and derivatives thereof (e.g. N-methylacrylamide, N,N-dimethylacrylamide, N,N-diethylacrylamide, N-isopropylacrylamide, N-t-butylacrylamide, and N-methylolacrylamide) to increase the stability of the dispersion.

In another preferred embodiment of the invention, the monomers polymerized include styrene and butadiene to produce a styrene-butadiene latex. In addition to styrene and butadiene, the monomers polymerized in this embodiment can optionally include at least one additional monomer. (Meth)acrylamide or derivatives thereof can preferably be added to increase the dispersion or colloidal stability of the dispersion. Furthermore, monomers such as (meth)acrylate ester monomers can be added, including 2-ethylhexylacrylate, n-butylacrylate, and methyl methacrylate.

In yet another preferred embodiment of the invention, a straight acrylic polymer can be produced using the acrylate and methacrylate monomers listed above. For the straight acrylics, methacrylamide or derivatives thereof can be added to increase the stability of the dispersion.

The molecular weight of the polymers produced according to the invention can be adjusted by adding a small amount of molecular weight regulators, generally up to 2% by weight, based on the monomers being polymerized: Particular regulators which can be used are organic thio compounds, preferably tert-dodecylmercaptan, and also allyl alcohols and aldehydes.

The initiator feed stream used in accordance with the invention can include at least one initiator or initiator system that is used to cause the polymerization of the monomers in the monomer feed stream. The initiator stream can also include water and other desired components appropriate for the monomer reaction to be initiated. The initiator can be any initiator known in the art for use in emulsion polymerization such as azo initiators; ammonium, potassium or sodium persulfate; or a redox system that typically includes an oxidant and a reducing agent. Commonly used redox initiation systems are described e.g., by A. S. Sarac in *Progress in Polymer Science* 24, 1149-1204 (1999). Preferred initiators include azo initiators and aqueous solutions of sodium persulfate. The initiator stream can optionally include one or more buffers or pH regulators, such as those described above.

In addition to the monomers and initiator, a nonionic surfactant is fed to the reactor. The nonionic surfactant can be provided in the initial charge of the reactor, provided in the monomer feed stream, provided in an aqueous feed stream, provided in a pre-emulsion, provided in the initiator stream, or a combination thereof. The nonionic surfactant can also be provided as a separate continuous stream to the reactor. The nonionic surfactant is typically provided in an amount of 1-5% by weight, based on the total weight of monomer and surfactant, and is preferably provided in an amount less than 2% by weight.

The preferred nonionic surfactant according to the invention comprises an alkylene oxide adduct of an alkyl, alkylbenzene or dialkylbenzene alcohol having less than or equal to 14 alkylene oxide groups, preferably less than or equal to 12 alkylene oxide groups, and more preferably less than or equal to 10 alkylene oxide groups (e.g. between 6 and 10 alkylene oxide groups). The more preferred nonionic surfactant comprises an ethylene oxide $(EO)_m$ and/or propylene oxide $(PO)_n$ adduct of an alkyl, alkylbenzene or dialkylbenzene alcohol wherein $(m+n) \leq 14$, preferably $(m+n) \leq 12$, and more preferably $(m+n) \leq 10$ (e.g. $6 \leq (m+n) \leq 10$). The nonionic surfactant may comprise an ethylene oxide adduct of an alcohol (with n=0), a propylene oxide adduct of an alcohol (with m=0) or a combination of ethylene oxide and propylene oxide (with m>0 and n>0) adduct of an alcohol. In the event m>0 and n>0, the ethylene oxide and propylene oxide can be provided as a random or a block copolymer. More preferably, the preferred nonionic surfactant is an ethylene oxide adduct of an alkyl alcohol, with n=0. The alkyl alcohol is preferably a branched or straight chain hydrocarbon having a single hydroxyl group, preferably a terminal hydroxyl group, that is ethoxylated. The alkyl group preferably includes 10 to 22 carbon atoms and more preferably 10 to 16 carbon atoms. Particularly preferred nonionic emulsifiers are ethylene oxide $(EO)_m$ adducts of tridecyl alcohol, wherein m=6, 8, or 10, such as those available from BASF under the ICONOL™ trademark. The term "nonionic" as used herein refers to materials that does not dissociate in the dispersion into positively and negatively charged species.

In accordance with the invention, the nonionic surfactant according to the invention preferably has a cloud point temperature below the polymerization temperature used to produce the polymer dispersion when the polymerization is in an aqueous solution. The cloud point temperature, also known as a cloud point, cloud temperature, or solubility inversion temperature, is the temperature at which the nonionic surfactant solution becomes cloudy (i.e. at and above that temperature the solution appears cloudy or turbid). As used herein, the cloud point temperature refers to the cloud point of a 1% aqueous solution of the surfactant. The cloud point temperature may be determined by visual observation of the solution over a range of temperatures, or by light scattering measurements. As used herein, the cloud point temperature is determined using ASTM D-2024-65R03. Preferably, the cloud point temperature for a 1% aqueous solution of the nonionic surfactant is between 30° C. and 90° C., more preferably between 35° C. and 85° C. For the preferred ethylene oxide $(EO)_m$ adducts of tridecyl alcohol, wherein m=6, 8, or 10, the cloud point temperatures are 38-43° C., 40-45° C., and 73-82° C., respectively. The nonionic surfactant also preferably has a HLB (hydrophilic lipophilic balance) at room temperature such that 8<HLB<15. More preferably, the HLB is 14 or less.

In addition to the nonionic surfactant of the invention, it may also be desirable to include an additional nonionic surfactant. Suitable nonionic surfactants include polyoxyalkylene alkyl ethers and polyoxyalkylene alkylphenyl ethers (e.g. diethylene glycol monoethyl ether, diethylene glycol diethyl ether, polyoxyethylene lauryl ether, polyoxyethylene stearyl ether, and polyoxyethylene nonylphenyl ether); oxyethylene-oxypropylene block copolymers; sorbitan fatty acid esters (e.g. sorbitan monolaurate available as SPAN® 20 from Merck Schuchardt OHG, sorbitan monooleate available as SPAN® 80 from Merck Schuchardt OHG, and sorbitan trioleate available as SPAN® 85 from Merck Schuchardt OHG); polyoxyethylene sorbitan fatty acid esters (e.g. polyoxyethylene sorbitan monolaurate available as TWEEN® 20 and TWEEN® 21 from Uniqema, polyoxyethylene sorbitan monopalmitate available as TWEEN® 40 from Uniqema, polyoxyethylene sorbitan monstearate available as TWEEN® 60, TWEEN® 60K, and TWEEN® 61 from Uniqema, polyoxyethylene sorbitan monooleate available as TWEEN® 80, TWEEN® 80K, and TWEEN® 81 from Uniqema, and polyoxyethylene sorbitan trioleate available as TWEEN® 85 from Uniqema); polyoxyethylene sorbitol fatty acid esters (e.g. tetraoleic acid polyoxyethylene sorbitol); glycerin fatty acid esters (e.g. glycerol monooleate); polyoxyethylene glycerin fatty acid esters (e.g. monostearic acid polyoxyethylene glycerin and monooleic acid polyoxyethylene glycerin); polyoxyethylene fatty acid esters (e.g. polyethylene glycol monolaurate and polyethylene glycol monooleate); polyoxyethylene alkylamine; and acetylene glycols.

It may be useful to include one ore more amphoteric surfactants in the polymerization step. Suitable amphoteric surfactants include those described in U.S. Pat. No. 6,540,822, which in incorporated herein by reference. An exemplary amphoteric surfactant for use in the invention is REDICOTE® E-7000 surfactant, which is available from Akzo Nobel.

Although additional nonionic or amphoteric surfactants can be combined with the nonionic surfactant of the invention, an anionic surfactant is typically not included in the emulsion polymerization reaction. Furthermore, a cationic surfactant is preferably not used in the emulsion polymerization reaction in accordance with the invention.

Once polymerization is completed, the polymer dispersion is preferably chemically stripped thereby decreasing its residual monomer content. This stripping process can include a chemical stripping step and/or a physical stripping step. Preferably, the polymer dispersion is chemically stripped by continuously adding an oxidant such as a peroxide (e.g. t-butylhydroperoxide) and a reducing agent (e.g. sodium acetone bisulfite), or another redox pair to the reactor at an elevated temperature and for a predetermined period of time (e.g. 0.5 hours). Suitable redox pairs are described by A. S. Sarac in *Progress in Polymer Science* 24, 1149-1204 (1999). An optional defoamer can also be added if needed prior to or during the stripping step. In a physical stripping step, a water or steam flush is used to further eliminate the non-polymerized monomers in the dispersion. Once the stripping step is completed, the pH of the polymer dispersion can be adjusted and a biocide or other additives can be added. Cationic, anionic, and/or amphoteric surfactants may optionally be added after the stripping step or at a later time if desired in the end product to provide a cationic or anionic polymer dispersion. The polymer particles of the resultant polymer dispersion preferably have an average particle size from 100 to 500 nm, more preferably 130-250 nm. The polymer particles prepared according to the invention are characterized by having a narrow particle size distribution. Specifically, the resultant volume-average distribution of polymer particles in the polymer dispersion preferably has a standard deviation of less than 30%.

Once the polymerization reaction is complete, and the stripping step is completed, the temperature of the reactor is reduced, thus making the nonionic surfactant water-soluble. While not wishing to be bound by theory, it is believed that the hydrocarbon chain of the nonionic surfactant immobilizes the surfactant into the monomer swollen particles, and the surfactant becomes physically trapped in the polymer chain. On the other hand, it is believed that the hydrophilic $(EO)_m$ and/or (PO)$_n$ chain remains at the polymer particle/water interface and extends towards the water phase, providing colloidal stability for the polymer dispersion. Therefore, though the temperature is below the cloud point temperature of the nonionic surfactant, the surfactant molecules do not migrate to the water phase. Thus, because there are limited amounts of free nonionic surfactant in the water phase of the latex, it is believed that the mechanical properties of the dried film are not adversely affected by the presence of the nonionic surfactants.

The polymer dispersion following the polymerization step according to the invention is essentially electrically neutral in that there are either essentially no charged groups in the polymer or there is essentially a balance of anionic and cationic charged groups in the polymer. The electrophoretic mobility ($\mu$) of the polymer dispersion can be used to measure the zeta potential to show the charge of the polymer dispersion although it is noted that the measurement may indicate an anionic character even though the polymer dispersion is essentially electrical neutral. For example, the resulting polymer dispersion can have a low negative surface charge due to the presence of grafted sulfate groups when a persulfate initiator is used or due to water molecules being absorbed to the polymer surface. However, the polymer dispersion of the invention would be classified as an essentially electrical neutral polymer dispersion as it is neutral and non-ionic in terms of the dispersion stability and acts with a nonionic character upon addition of anionic or cationic surfactants, electrolytes, or high valency electrolytes. Examples of dispersions that are essentially electrically neutral in terms of dispersion stability and act with a nonionic character, but have ionic zeta potential measurements are provided in S. Usui, Y. Imamura and E. Barouch, Destabilization of oil-in-water emulsion with inorganic electrolytes in the absence and in the presence of sodium dodecyl sulfate, J. Dispersion Science and Technology 8(4), 359-384 (1987) (measured zeta potential of decane particles as a function of electrolyte concentration show strongly negatively charged even without the anionic surfactant) and S. Usui and H. Sasaki, Zeta potential measurements of bubbles in aqueous surfactant solutions, J. Colloid and Interface Science, 65(1), 36-45 (1978) (zeta potential of argon gas bubbles in the presence of nonionic surfactant $C_{12}$POE measures highly negative).

The polymer dispersions prepared with nonionic surfactants and nonionic copolymerizable monomers according to the invention can be combined with cationic or anionic surfactant solutions or electrolytes over a wide range of pH's without causing coagulation. Therefore, both anionic (negatively charged) and cationic (positively charged) polymer dispersions can be produced using most of the same conventional emulsion polymerization equipment at the same production facility without causing coagulation and other problems associated with cross-contamination. The polymer dispersions of the invention can also be combined with polymer dispersions having cationic or anionic charges in a blend ratio of greater than 0% to 30% of the charged dispersion to the essentially electrically neutral polymer dispersion of the invention to produce a cationic or anionic polymer emulsion.

In one embodiment of the invention, the resulting essentially electrically neutral polymer dispersion can be combined with one or more of a cationic surfactant or cationic polyelectrolytes to produce a cationic polymer emulsion. Suitable cationic surfactants and polyelectrolytes include alkylamine salts, quaternary ammonium salts, cationic surfactants available from Akzo Nobel under the REDICOTE® trademark (such as REDICOTE® 4819, REDICOTE® E-64R, REDICOTE® E-5, REDICOTE® E-9, REDICOTE® E9A, REDICOTE® E-11, REDICOTE® E-16, REDICOTE® E-44, REDICOTE® E-120, REDICOTE® E-250, REDICOTE® E-2199, REDICOTE® E-4868, REDICOTE® C-346, REDICOTE® C-404, REDICOTE® C-450, and REDICOTE® C-471), cationic surfactants available from MeadWestvaco under the INDULIN® and AROSURF® trademarks (such as INDULIN® 814, INDULIN® AMS, INDULIN® DF-30, INDULIN® DF-40, INDULIN® DF-42, INDULIN® DF-60, INDULIN® DF-80, INDULIN® EX, INDULIN® FRC, INDULIN® MQK, INDULIN® MQK-1M, INDULIN® MQ3, INDULIN® QTS, INDULIN® R-20, INDULIN® SBT, INDULIN® W-1, and INDULIN® W-5), ASFIER® N480 available from Kao Specialties Americas, CYPRO™ 514 available from Cytec Industries, polyethyleneimines such as those available from BASF under the POLYMIN® trademark (such as POLYMIN® SK, POLYMIN® SKA, POLYMIN® 131, POLYMIN® 151, POLYMIN® 8209, POLYMIN® P, and POLYMIN® PL), and polyvinylamines such as those available from BASF under the CATIOFAST® trademark (such as CATIOFAST® CS, CATIOFAST® FP, CATIOFAST® GM, and CATIOFAST® PL). Other suitable cationic polyelectrolytes and surfactants include those listed in U.S. Pat. Nos. 5,096,495, 5,160,453, and 5,443,632. The type of cationic surfactant or polyelectrolyte used will depend on many factors, including the end use of the polymer dispersion. The resulting cationic polymer dispersion can be used, for example, in paper making applications, paper sizing applications, and the production of polymer-modified asphalt and concrete.

In another embodiment of the invention, the resulting essentially electrically neutral polymer dispersion can be combined with one or more of an anionic surfactant and an anionic electrolyte to produce an anionic polymer emulsion. Suitable anionic surfactants include organic sulfates and sulfonates, such as sodium and potassium alkyl sulfates; phosphate esters; and sucrose esters. Suitable anionic polyelectrolytes may include tartrates, borates, oxalates and phosphates. Additional suitable anionic surfactants and polyelectrolytes include but are not limited to M28B and other anionic surfactants available from MeadWestvaco under the INDULIN® trademark (such as INDULIN® AMS, INDULIN® SA-L, INDULIN® ISE, INDULIN® 201, INDULIN® 202, and INDULIN® 206); anionic surfactants available from Akzo Nobel under the REDICOTE® trademark (such as REDICOTE® E-15 and REDICOTE® E-62C); and lignosulfonates such as those available under the MARASPERSE™ trademark (such as MARASPERSE™ CBOS-3 and MARASPERSE™ N22). The type of anionic surfactant or polyelectrolyte used will depend on many factors, including the end use of the polymer dispersion. The resulting anionic polymer dispersion can be used, for example, in paints, paper coatings, adhesives, carpet backing, printing inks, non-woven fabric, leather finishing, dipping goods, asphalt and concrete modifications, medical applications, and the modification of plastic materials.

In one embodiment of the invention, the polymerization step can be a nonionic process where only nonionic monomers and surfactants are used in the polymerization process. Alternatively, the polymerization step can include one or more amphoteric surfactants that do not provide an overall charge to the polymer dispersion. Due to the essentially electrically neutral nature, the resulting polymer dispersion according to the invention exhibits tolerance to charged chemical species, and it is colloidally stable in high-electrolyte media, such as a one molar calcium chloride solution.

The resulting polymer can then be combined with a cationic or anionic surfactant or electrolyte to produce a charged polymer dispersion.

In one embodiment of the invention, the polymer dispersion may be used to produce a polymer powder, such as a water-redispersible polymer powder. The polymer powder may be produced from the aqueous polymer dispersion by removing water through means well-known in the art, such as by freeze drying or spray drying, preferably spray drying. In spray drying, the polymer dispersion is typically sprayed in a stream of hot air in a drying tower. For example, the stream of hot air enters the drying tower at from 100 to 200° C., preferably from 120 to 160° C., and exits at from 30 to 90° C., preferably from 60 to 80° C. The polymer dispersion is introduced preferably in parallel into the stream of hot air. Spraying of the polymer dispersion and/or other additives can be done by way of single-substance or multi-substance nozzles or by using a rotating disk. The polymer powders may be separated off using cyclones or filter separators.

In a preferred embodiment of producing a polymer powder, a water-soluble colloidal stabilizer is added to the aqueous polymer dispersion prior to spray-drying as a spraying aid and/or to ensure redispersibility. The preferred water-soluble colloidal stabilizers for spray drying are polyvinyl alcohols (PVA's). Other spraying aids that may be used include polyvinylpyrrolidone, cellulose derivatives, starch derivatives, and water-soluble condensation products made from melamine and formaldehyde or from naphthalenesulfonic acid and formaldehyde. The amount of the spraying aid generally used is from 1 to 40% by weight, preferably from 2 to 30% by weight, and most preferably 5 to 25% by weight, based on the weight of polymer in the dispersion.

Antifoamers may also be optionally added to the aqueous dispersion prior to spray drying, preferably up to 1.5% by weight. Antiblocking or anticaking agents, such as highly disperse silicic acid, may also optionally be added. For example, anticaking agents may be added during the spray drying process by spraying the anticaking agent into the drying tower through a separate nozzle. Alternatively, the dried polymer powder may be admixed with an antiblocking or anticaking agent, preferably up to 30% by weight, based on the total weight of polymer.

The nonionic, cationic and anionic polymer dispersions prepared according to the invention can be dried to form a film by evaporating the dispersing medium in the dispersion. A film produced according to the invention from poly(styrene-butadiene) or poly(styrene-acrylate) or polyacrylic polymer dispersions exhibits excellent water resistance and absorbs less than 15% water. Furthermore, a film according to the invention produced from poly(styrene-butadiene) polymer dispersions and having greater than 40% styrene also maintains excellent wet tensile strength. As shown in the following examples, the films produced from the preferred embodiments of the invention can absorb less than 10% water and even less than 5% water, particularly for polymers having greater than 40% styrene. It was unexpected that the use of a hydrophilic surfactant could produce a dried film that is very hydrophobic, having an initial advancing contact angle of above 90 degrees with water. Moreover, it was even more unexpected that the presence of a polar copolymerizable monomer (e.g., acrylamide or methacrylamide) would provide the advantageous hydrophobicity of the resulting film. As the polymer dispersions according to the invention result in films with high moisture resistance, the polymer dispersions and can be used in applications that require a moisture barrier function, such as coatings, and in various high-moisture applications.

Moreover, films produced from poly(styrene-butadiene) or poly(styrene-acrylate) or polyacrylic polymer dispersions according to the invention exhibit relatively high mechanical strength even in the absence of traditional crosslinking if the polymer contains up to 2% (meth)acrylamide or derivatives thereof. This is most apparent in low-$T_g$ polystyrene-butyl acrylate) systems, containing less than 10% styrene, as shown in the following examples.

Furthermore, because of the absence of anionically charged surfactants and vinyl acids, the polymer dispersions of the invention are colloidally stable at a wide range of pH's, can include no or low levels of electrolytes, and are stable in the presence of high valency cations such as $Ca^{2+}$, $Mg^{2+}$, and $Al^{3+}$ ions. Thus, the polymer dispersions resist or do not promote coagulation within a mixture. Moreover, the electrically neutral polymer dispersions of the invention have a low electrical conductance and a high electrical resistance as is desirable in applications such as in primer paints for corrosion protection or as an additive to cement to act as a moisture barrier.

The invention provides essentially electrically neutral polymer dispersions that can be converted to charged dispersions and that are tolerant to cationically- or anionically-charged additives, such as metal salt mildewcides, fungicides, and other biocides. The invention also provides essentially electrically neutral polymer dispersions that are colloidally stable in a high-electrolyte medium, and that have excellent water resistance and wet mechanical properties. The polymer dispersions of the invention having greater than 40% styrene display extraordinarily high water resistance, exemplified in water absorptions that can be as low as 5% or less, compared to closer to 20% for conventional systems. Surprisingly, it has been found that even in the absence of butadiene and other monomers prone to effect cross-linking and even with systems having a polymer $T_g$ of less than −20° C., the mechanical strength of the resulting polymer films can be increased if the polymer contains a small amount of (meth)acrylamide. Furthermore, it has been found that the essentially electrically neutral polymer dispersions according to the invention undergo unique interactions with associative thickeners, such as HEUR-type thickeners. Accordingly, the electrically neutral polymer dispersions according to the invention may be used to affect the rheology of a substance or mixture.

The invention is further described in the following examples. The examples are merely illustrative and do not in any way limit the scope of the invention as described and claimed. All parts are parts by weight unless otherwise noted.

EXAMPLES

The polymer latices described below were produced in a seeded semi-batch emulsion polymerization process using reactors equipped with a mechanical stirrer. The total solids content was determined using a CEM Labware 9000 Microwave Moisture/Solids Analyzer with a 70% power setting. The pH was determined using an Orion 310 pH meter calibrated prior to use. The particle size was determined using a NICOMP™ 308 Submicron Particle Sizer and a dynamic light scattering method at an angle of 90° at 25° C. The viscosity of each sample was determined using a Brookfield RV BF-1 DVII viscometer.

Synthesis of Example Latices—Acrylic Latices

Example 1

The following ingredients were charged in a reaction vessel: 320.3 g water, 14.3 g of a 32% active seed aqueous emulsion (polystyrene), 0.7 g of a 40% aqueous solution of ethylene diamine tetraacetic acid (EDTA), and 0.7 g. of a 10% aqueous solution of potassium hydroxide (KOH). The mixture was heated to 80° C. From an initiator feed of 17.8 g water and 1.9 g sodium persulfate, 12% was removed and added to the reaction mixture. Two separate feeds were added to the vessel at a constant feed rate. The remainder of the initiator Feed was added at a constant feed rate over 4.5 hours. A monomer emulsion feed, consisting of 543.1 g water, 21.3 g of a 90% active nonionic surfactant composed of an 8-mole ethylene oxide adduct of tridecyl alcohol, 5.8 g. of 10% aqueous KOH, 27.2 g of 53% aqueous acrylamide, 96.0 g. styrene, 240.0 g. 2-ethylhexylacrylate (2-EHA), and 609.6 g n-butyl acrylate (n-BA), was added over 4.0 hours to the reactor. During the duration of the feeds, the temperature was maintained at 80° C. After the feeds were completed, the monomer emulsion tank was flushed with 28.8 g water. After a 30 minute post-reaction period the dispersion was post-stripped by adding the following two mixtures as two separate feeds over the course of an hour at a constant temperature of 80° C.: (a) 2.6 g 70% tert-butyl hydroperoxide solution and 24.0 g water, and (b) 2.0 g sodium metabisulfite, 1.2 g acetone, and 23.4 g water. After the temperature was maintained for 15 minutes following the two additional feeds, the polymer dispersion was cooled, and optional post-additions (such as biocide) were added. The final product had 49.5% total solids, a mean particle size of 175 nm, a pH of 3.4, and a viscosity of 210 cps.

Example 2

Example 2 was prepared using the method described for Example 1, but with the following changes to the initial reactor charge and monomer emulsion mixture feed. The initial reactor charge had 23.4 g of 32% aqueous polystyrene seed emulsion. The monomer emulsion mixture feed consisted of 4.8 g 10% KOH, 76.0 g styrene, 35.9 g of 53% aqueous solution of acrylamide, 855.0 g n-butyl acrylate, and no 2-ethylhexylacrylate. The final product had 49.6% total solids, a mean particle size of 156 nm, a pH of 3.0, and a viscosity of 470 cps.

Example 3

Example 3 was prepared using the method described for Example 1, but with the following changes to the pre-emulsion feed. The monomer emulsion mixture feed was as in Example 1, but with 849.6 g n-butyl acrylate and no 2-ethylhexylacrylate. The final product had 49.6% total solids, a mean particle size of 196 nm, a pH of 3.2, a viscosity of 400 cps, and the resultant polymer had a glass transition temperature ($T_g$) of −42° C.

Example 4

Example 4 was prepared using the method described for Example 1, but with the following changes. The monomer emulsion mixture feed had 518.4 g water, 637.0 g n-butyl acrylate and no acrylamide. The final product had 49.0% total solids, a mean particle size of 179 nm, a pH of 2.6, and a viscosity of 50 cps.

Example 5

Example 5 was prepared using the method described for Example 1, but with the following changes. The monomer emulsion mixture feed had 531.5 g water, 19.4 g 100% active nonionic surfactant composed of a 6-mole ethylene oxide adduct of tridecyl alcohol, and no 8-mole ethylene oxide adducts of tridecyl alcohol. The polymer dispersion had 49.9% total solids, an average particle size of 185 nm, a pH of 3.2, and a viscosity of 550 cps.

Example 6

Example 6 was prepared using the method described for Example 1, but with the following changes. The initial charge had 346.7 g water. The monomer emulsion mixture feed had 501.9 g water, 4.9 g 10% aqueous KOH, 37.0 g 53% aqueous acrylamide, 441.0 g styrene, 519.4 g n-butyl acrylate, and no 2-ethylhexylacrylatc. The initiator feed consisted of 26.0 g water and 1.9 g sodium persulfate. The polymer dispersion had 49.8% total solids, an average particle size of 201 nm, a pH of 4.4, and a viscosity of 1130 cps.

Example 7

Example 7 was prepared using the method described for Example 1, but with the following changes. The monomer emulsion mixture feed had 531.5 g water, 19.4 g 100% active nonionic surfactant composed of a 10-mole ethylene oxide adduct of tridecyl alcohol, and 849.6 g n-butyl acrylate. The 8-mole ethylene oxide adduct of tridecyl alcohol and 2-ethylhexylacrylate were not used. The polymer dispersion had 49.2% total solids, an average particle size of 175 nm, a pH of 3.0, and a viscosity of 370 cps.

Example 8

Example 8 was prepared using the method described for Example 1, but with the following changes. The monomer emulsion mixture feed had 533.5 g water, 19.6 g 100% active nonionic surfactant composed of a 10-mole ethylene oxide adduct of tridecyl alcohol, 4.9 g 10% aqueous KOH, 37.0 g 53% aqueous acrylamide, 499.8 g n-butyl acrylate, 460.6 g methyl methacrylate (MMA), and no 8-mole ethylene oxide adducts of tridecyl alcohol. The polymer dispersion had 49.2% total solids, an average particle size of 160 nm, a pH of 2.7, and a viscosity of 134 cps.

Comparative Example 1

Comparative Example 1 was prepared using the method described for Example 1, but with the following change. The monomer emulsion mixture feed had 14.4 g acrylic acid rather than acrylamide. The polymer dispersion had 49.6% total solids, an average particle size of 172 nm, a pH of 3.0, and a viscosity of 140 cps.

The monomer and surfactant compositions used in Examples 1-8 and Comparative Example 1 (CE1) are summarized in Table 1 below.

TABLE 1

Monomer and Surfactant Concentrations (in parts per 100 monomers)

| | Example: | | | | | | | | |
|---|---|---|---|---|---|---|---|---|---|
| | 1 | 2 | 3 | 4 | 5 | 6 | 7 | 8 | CE1 |
| Styrene | 10 | 8 | 10 | 10 | 10 | 45 | 10 | 0 | 10 |
| MMA | 0 | 0 | 0 | 0 | 0 | 0 | 0 | 47 | 0 |
| n-BA | 63.5 | 90 | 88.5 | 65 | 63.5 | 53 | 88.5 | 51 | 63.5 |
| 2-EHA | 25 | 0 | 0 | 25 | 25 | 0 | 0 | 0 | 25 |
| Acrylic acid | 0 | 0 | 0 | 0 | 0 | 0 | 0 | 0 | 1.5 |
| Acrylamide | 1.5 | 2 | 1.5 | 0 | 1.5 | 2 | 1.5 | 2 | 0 |

TABLE 1-continued

Monomer and Surfactant Concentrations (in parts per 100 monomers)

| | Example: | | | | | | | | |
|---|---|---|---|---|---|---|---|---|---|
| | 1 | 2 | 3 | 4 | 5 | 6 | 7 | 8 | CE1 |
| $(EO)_6$ surfactant | 0 | 0 | 0 | 0 | 2 | 0 | 0 | 0 | 0 |
| $(EO)_8$ surfactant | 2 | 2 | 2 | 2 | 0 | 2 | 0 | 0 | 2 |
| $(EO)_{10}$ surfactant | 0 | 0 | 0 | 0 | 0 | 0 | 2 | 2 | 0 |

The latices prepared according to Examples 1-3 were low $T_g$ polymers having a $T_g$ of about −40 to −45° C. and contained 1.5-2.0% acrylamide. The latex of Example 4 was a low $T_g$ polymer without acrylamide. The latex of Example 5 used a smaller EO-chain surfactant. The latex of Example 6 was a high $T_g$ polymer based on styrene and n-butylacrylate. The latices of Examples 7 and 8 used a larger EO-chain surfactant. The latex of Example 8 also used a high $T_g$ polymer based on methylmethacrylate and n-butylacrylate. The latex of Comparative Example 1 included a low $T_g$ polymer that included acrylic acid instead of acrylamide.

Synthesis of Example Latices—Styrene Butadiene Latices

Example 9

The following ingredients were charged in a reaction vessel: 1076.3 g water, 36.6 g of a 32% active seed aqueous polystyrene emulsion, 1.3 g 40% aqueous solution of EDTA and 1.7 g tetrasodium pyrophosphate. The mixture was heated to 90° C. From an initiator feed of 166.2 g water and 12.8 g sodium persulfate, 28.5% was removed and added to the reaction mixture. Subsequently, the following four separate feeds were added with a constant feed rate. Feed (a) was the remainder of the initiator feed, which was added over 5.0 hours. Feed (b) was an aqueous feed consisting of 549.6 g water, 41.5 g of an 8-mole ethylene oxide adduct of tridecyl alcohol (90% active in water), 1.9 g tetrasodium pyrophosphate, and 70.5 g of 53% aqueous acrylamide and was added over 2.5 hours. Feed (c) consisted of 595.0 g of 1,3-butadiene, which was added over 4.0 hours. Feed (d) consisted of a mixture of 1130.3 g styrene and 13.5 g tert-dodecylmercaptan, which was added over 4.0 hours. During the entire duration of the feeds the temperature was maintained at 90° C. After a 60-minute post-reaction period the resultant dispersion was allowed to cool down, and the pH was adjusted to 6.5 using 10% aqueous KOH. In a stripping reactor equipped with a steam inlet, the product was subjected to a monomer removal procedure. While controlling the temperature at 74° C., steam was passed through the dispersion and two solutions were simultaneously fed in two streams within 2.0 hours: (e) 56 mL aqueous tert-butyl hydroperoxide solution and (f) 56 mL aqueous 5% sodium metabisulfite. The resultant polymer dispersion had 50.6% total solids, an average particle size of 156 nm, and a pH of 4.6.

Example 10

1069.5 g water, 33.4 g of a 32% active seed aqueous emulsion (polystyrene), 1.3 g 40% aqueous solution of EDTA, and 1.7 g tetrasodium pyrophosphate were charged into a reaction vessel. The mixture was heated to 90° C. From an initiator feed of 166.2 g water and 12.8 g sodium persulfate, 28.5% was removed and added to the reaction mixture. Subsequently, the following four separate feeds were added with constant feed rate. Feed (a) consisted of the remainder of the initiator feed, added over 5.0 hours. Feed (b) consisted of an aqueous feed consisting of 550.1 g water, 37.4 g of a 10-mole ethylene oxide adduct of tridecyl alcohol, 1.9 g tetrasodium pyrophosphate, and 77.5 g 53% aqueous acrylamide added over 2.5 hours. Feed (c) consisted of 591.6 g 1,3-butadiene added over 4.0 hours. Feed (d) consisted of a mixture of 1130.3 g styrene and 13.5 g tert-dodecylmercaptan, added over 4.0 hours. During the entire duration of the feeds the temperature was maintained at 90° C. After a 30-minute post-reaction period the resultant dispersion was allowed to cool. In a stripping reactor equipped with steam inlet the product was subjected to a monomer removal procedure. While controlling the temperature at 74° C., steam was passed through and simultaneously these two solutions were fed in two streams within 2 hours (e) 56 mL aqueous 5% tert-butyl hydroperoxide solution and (f) 56 mL aqueous 5% sodium metabisulfite. The resultant polymer dispersion had 49.9% total solids, an average particle size of 157 nm, a pH of 3.9, and the resultant polymer had a $T_g$ of +7° C.

Example 11

880.6 g water, 27.8 g of a 32% active seed aqueous emulsion (polystyrene), 1.1 g 40% aqueous solution of EDTA, and 1.4 g tetrasodium pyrophosphate were charged into a reaction vessel. The mixture was heated to 90° C. From an initiator feed of 146.7 g water and 11.3 g sodium persulfate, 28.5% was removed and added to the reaction mixture. Subsequently, the following four separate feeds were added with constant feed rate. Feed (a) consisted of the remainder of the initiator feed, added over 5.0 hours. Feed (b) consisted of an aqueous feed consisting of 457.2 g water, 31.3 g of a 10-mole ethylene oxide adduct of tridecyl alcohol, 1.6 g tetrasodium pyrophosphate, and 73.9 g 53% aqueous acrylamide added over 2.5 hours. Feed (c) consisted of 441.0 g 1,3-butadiene added over 4.0 hours. Feed (d) consisted of a mixture of 982.4 g styrene and 26.8 g tert-dodecylmercaptan, added over 4.0 hours. During the entire duration of the feeds the temperature was maintained at 90° C. After a 30-minute post-reaction period the resultant dispersion was allowed to cool. In a stripping reactor equipped with steam inlet the product was subjected to a monomer removal procedure. While controlling the temperature at 74° C., steam was passed through and simultaneously these two solutions were fed in two streams within 2 hours (e) 56 mL aqueous 5% tert-butyl hydroperoxide solution and (f) 56 mL aqueous 5% sodium metabisulfite. The resultant polymer dispersion had 50.3% total solids, an average particle size of 164 nm, a pH of 3.2, and the resultant polymer had a $T_g$ of +8° C.

The monomer and surfactant compositions used in Example 9-11 are summarized in Table 2 below.

TABLE 2

Monomer and Surfactant Concentrations (in parts per 100 monomers)

| Example: | 9 | 10 | 11 |
|---|---|---|---|
| Styrene | 63.0 | 63.0 | 66.0 |
| 1,3-Butadiene | 35.0 | 34.8 | 31.5 |
| Acrylamide | 2.0 | 2.2 | 2.5 |

TABLE 2-continued

Monomer and Surfactant Concentrations
(in parts per 100 monomers)

| Example: | 9 | 10 | 11 |
|---|---|---|---|
| (EO)$_8$ surfactant | 2.0 | 0.0 | 0.0 |
| (EO)$_{10}$ surfactant | 0.0 | 2.0 | 2.0 |
| t-dodecylmercaptan | 0.8 | 0.8 | 1.8 |

The latices of Examples 9 and 10 included low levels of chain-transfer agent (t-dodecylmercaptan) while the latex of Example 11 included a relatively high level of chain-transfer agent. The polystyrene butadiene latices of Examples 9-11 all had similar $T_g$'s.

When 1 drop of each latex was put into 2-3 mL of a 1.0 M calcium chloride ($CaCl_2$) solution, each of latices of Examples 1-11 were stable, exhibiting no coagulation. The latex of Comparative Example 1, which included acrylic acid, immediately coagulated in the presence of the $CaCl_2$ solution.

Latex Film Preparation and Testing of Mechanical Properties of the Films

A latex film was prepared from each of the latices prepared according to Examples 1-11 and Comparative Example 1 by first adding to each polymer dispersion enough water to achieve a 40% total solids content. The resulting diluted dispersion was then poured into a Teflon mold and air dried for 7 days at 25° C. with 50% humidity. After an initial drying phase of 2 to 3 days, the film was flipped upside down to expose both sides to the air. The thickness of each dry latex film was on the order of 0.02 inches.

The sample films were prepared for tensile experiments by placing releasing paper on both sides of each sample film. Corresponding 0.158 inch width "dog bone" shaped samples were cut. Three samples of each film were tested using an Instron 4505, equipped with a 22 lb load cell. The samples were elongated at a rate of 7.9 inches per minute, and a maximum strength and elongation at break were recorded.

The water absorption of the films was determined by cutting 2 inch by 2 inch film samples, measuring the dry weight of each sample, soaking each sample in deionized water for 24 hours, then measuring the weight of the sample after removal from the water. Water absorption is expressed as a percentage of weight gained, and is an average for between 3 and 5 specimens per latex.

Table 3 provides the mechanical properties of the latices of Examples 1-6 and Comparative Example 1 below.

TABLE 3

Mechanical Properties of Acrylic Latex Polymer Film

| | Example: | | | | | | |
|---|---|---|---|---|---|---|---|
| | 1 | 2 | 3 | 4 | 5 | 6 | CE1 |
| Tensile strength (psi) | 82 | 140 | 104 | 12 | 114 | 896 | 22 |
| Elongation (%) | 1794 | 1096 | 1663 | >2600 | 1425 | 592 | 1758 |
| Water absorption (%) | 10 | 11 | 12 | 6 | 13 | 4 | 10 |

The low $T_g$ acrylic polymers of Examples 1-3, which range from −40 to −45° C., displayed high tensile strength, on the order of 80 to 140 pounds per square inch (psi), as shown in Table 3. The acrylic polymers of Example 4 and Comparative Example 1 were comparatively weaker, which suggest that the presence of the acrylamide increased the strength of the latices.

Table 4 provides the mechanical properties of the latices of Examples 9-11 below.

TABLE 4

Mechanical Properties of Sryrene-Butadiene Latex Polymer Film

| Example: | 9 | 10 | 11 |
|---|---|---|---|
| Tensile strength (psi) | 702 | 701 | 389 |
| Elongation (%) | 733 | 649 | 681 |
| Water absorption (%) | 1.6 | 1.9 | 2.4 |

Water absorption from the three styrene-butadiene polymers of Examples 9-11 were all very low, on the order of 2%, as shown in Table 4. The latex of Example 11 displayed slightly higher water absorption than Examples 9 and 10. This particular latex was produced with double the amount of chain-transfer agent as compared to the latices of Examples 9 and 10.

Additional polymer films were prepared and more extensive tests were performed on the dry and wet films of Examples 6 and 9 as shown in Table 5 below. The polymer films were soaked in water for 24 hours, patted dry with a paper towel, and then tested for tensile strength and elongation immediately following removal from the water bath (shown as "wet polymer film"). Another set of polymer films of Example 6 and 9 were soaked in water for 24 hours, allowed to air dry for 24 hours, then tested for tensile strength and elongation (shown as "re-dried wet polymer film"). As with the film formed from the acrylic latex prepared according to Example 6, the film derived from the styrene-butadiene latex of Example 9 did not lose cohesive strength after a 24 hour soak period in water.

TABLE 5

Wet and Dry Mechanical Properties of the Polymer Films

| | Example 6 | | Example 9 | |
|---|---|---|---|---|
| | Tensile strength (psi) | Elongation at break (%) | Tensile strength (psi) | Elongation at break (%) |
| Dry Polymer Film | 896 | 592 | 702 | 733 |
| Wet Polymer Film | 649 | 680 | 757 | 754 |
| Re-dried Wet Polymer Film | 880 | 669 | 638 | 710 |

It is understood that upon reading the above description of the present invention, one skilled in the art could make changes and variations therefrom. These changes and variations are included in the spirit and scope of the following appended claims.

That which is claimed:
1. A method of producing an essentially electrically neutral polymer dispersion, comprising polymerizing one or more nonionic monomers in the presence of at least one surfactant, wherein the at least one surfactant consists essentially of at least one nonionic alkylene oxide adduct of an alkyl alcohol, alkylbenzene alcohol or dialkylbenzene alcohol, wherein the number of alkylene oxide groups is less than or equal to 14.
2. The method as claimed in claim 1, wherein said polymerizing step occurs in the absence of ionic monomers.

3. The method as claimed in claim 1, wherein the alkyl group in the alkyl alcohol, alkylbenzene alcohol or dialkylbenzene alcohol includes 16 carbon groups or less.

4. The method as claimed in claim 1, wherein the at least one surfactant includes a nonionic alkylene oxide adduct of an alkyl alcohol.

5. The method as claimed in claim 1, wherein the at least one surfactant includes a nonionic alkylene oxide adduct of a C10-C16 alkyl alcohol.

6. The method as claimed in claim 1, wherein said polymerizing step occurs at a polymerization temperature and the cloud point temperature of the at least one nonionic surfactant is less than the polymerization temperature.

7. A dispersion comprising one or more copolymerizable nonionic monomers and at least one surfactant, wherein the at least one surfactant consists essentially of at least one nonionic alkylene oxide adduct of an alkyl alcohol, alkylbenzene alcohol or dialkylbenzene alcohol, wherein the number of alkylene oxide groups is less than or equal to 14.

8. The dispersion as claimed in claim 7, wherein said dispersion is free of ionic monomers.

9. The dispersion as claimed in claim 7, wherein the alkyl group in the alkyl alcohol, alkylbenzene alcohol or dialkylbenzene alcohol includes 16 carbon groups or less.

10. The dispersion as claimed in claim 7, wherein the at least one surfactant includes a nonionic alkylene oxide adduct of an alkyl alcohol.

11. The dispersion as claimed in claim 7, wherein the at least one surfactant includes a nonionic alkylene oxide adduct of a C10-C16 alkyl alcohol.

12. The dispersion as claimed in claim 7, wherein the at least one surfactant has a cloud point temperature from 30° C. to 90° C.

13. An aqueous polymer dispersion comprising polymer particles, water, and at least one surfactant, wherein the at least one surfactant consists essentially of at least one nonionic alkylene oxide adduct of an alkyl alcohol, alkylbenzene alcohol or dialkylbenzene alcohol, wherein the number of alkylene oxide groups is less than or equal to 14, and wherein said polymer particles are derived from one or more nonionic monomers and dispersed in the water and said at least one surfactant is entrained in said polymer particles.

14. The dispersion as claimed in claim 13, wherein said polymer particles are derived only from nonionic monomers.

15. The dispersion as claimed in claim 13, wherein the alkyl group in the alkyl alcohol, alkylbenzene alcohol or dialkylbenzene alcohol includes 16 carbon groups or less.

16. The dispersion as claimed in claim 13, wherein the at least one surfactant includes a nonionic alkylene oxide adduct of an alkyl alcohol.

17. The dispersion as claimed in claim 13, wherein the at least one surfactant includes a nonionic alkylene oxide adduct of a C10-C16 alkyl alcohol.

18. The dispersion as claimed in claim 13, wherein the at least one surfactant has a cloud point temperature from 30° C. to 90° C.

* * * * *